United States Patent
Mege et al.

(10) Patent No.: US 7,454,219 B2
(45) Date of Patent: Nov. 18, 2008

(54) METHOD OF SYNCHRONIZATION OF THE UPLINK CHANNEL OF A SIMULCAST NETWORK

(75) Inventors: Philippe Mege, Bourg la Reine (FR); Christophe Molko, Villepreux (FR); Frédéric Rosin, Saint Cyr l'ecole (FR)

(73) Assignee: EADS Secure Networks, Montigny le Bretonneaux (FR)

( * ) Notice: Subject to any disclaimer, the term of this patent is extended or adjusted under 35 U.S.C. 154(b) by 382 days.

(21) Appl. No.: 10/596,800

(22) PCT Filed: Dec. 14, 2004

(86) PCT No.: PCT/EP2004/014220

§ 371 (c)(1),
(2), (4) Date: Jun. 23, 2006

(87) PCT Pub. No.: WO2005/064974

PCT Pub. Date: Jul. 14, 2005

(65) Prior Publication Data
US 2007/0099639 A1    May 3, 2007

(30) Foreign Application Priority Data
Dec. 23, 2003    (FR) .................................. 03 15322

(51) Int. Cl.
*H04B 7/00* (2006.01)
*H04B 15/00* (2006.01)
(52) U.S. Cl. ........................................ 455/503; 455/502
(58) Field of Classification Search .................. 455/502, 455/503
See application file for complete search history.

(56) References Cited

U.S. PATENT DOCUMENTS
5,590,403 A * 12/1996 Cameron et al. ............ 455/503
(Continued)

FOREIGN PATENT DOCUMENTS
WO    WO 03/073668    9/2003

OTHER PUBLICATIONS
International Search Report for International Patent Application No. PCT/EP2004/014220, dated Mar. 9, 2005, 2 pages.

*Primary Examiner*—Matthew D. Anderson
*Assistant Examiner*—Bobbak Safaipour
(74) *Attorney, Agent, or Firm*—Miller, Matthias & Hull (57) ABSTRACT

A method of synchronization on the uplink channel of a Simulcast network with a plurality of fixed receivers (BS1-BS4) and a selection unit (20), comprises the following steps. All the receivers are placed in a synchronization search mode (702), in which they search for a synchronization pattern sent by the mobile terminal over the uplink channel. When a receiver detects the synchronization pattern, it produces an initial synchronization context (SC3(0)), which indicates the delay of the radio signal relative to a time reference of the network, and transmits it (705) to the selection unit. The latter broadcasts it (707) to all the receivers that use it to start processing the radio signal. Then, each receiver maintains its synchronization context and transmits it (708-712) to the selection unit on each frame. At regular intervals, the value of an updated synchronization context (SC2(*i*)) is broadcast (714) to the receivers. Advantage: the synchronization of a receiver which begins to receive the radio signal during a call or alternate turn is facilitated.

20 Claims, 4 Drawing Sheets

U.S. PATENT DOCUMENTS

| | | | |
|---|---|---|---|
| 5,634,198 A * | 5/1997 | Cameron et al. | 455/63.1 |
| 5,850,610 A * | 12/1998 | Testani et al. | 455/512 |
| 6,266,536 B1 * | 7/2001 | Janky | 455/503 |
| 6,470,188 B1 * | 10/2002 | Ohtani et al. | 455/503 |
| 7,058,034 B2 * | 6/2006 | Pekonen | 370/331 |
| 7,058,422 B2 * | 6/2006 | Learned et al. | 455/526 |
| 7,099,654 B1 * | 8/2006 | Tewfik | 455/410 |
| 2003/0161290 A1 * | 8/2003 | Jesse et al. | 370/338 |
| 2007/0184862 A1 * | 8/2007 | Hartless | 455/503 |

* cited by examiner

METHOD OF SYNCHRONIZATION OF THE UPLINK CHANNEL OF A SIMULCAST NETWORK

CROSS-REFERENCE TO RELATED APPLICATION

This is the U.S. National Phase of International Application No. PCT/EP2004/014220 filed Dec. 14, 2004, the entire disclosure of which is incorporated herein by reference.

BACKGROUND OF THE INVENTION

1. Technical Field

The present invention relates generally to simultaneous broadcast, or Simulcast, networks, and more specifically to a method of synchronization on the uplink channel of such a network.

The invention should find application, in particular, in Professional Mobile Radio (PMR) systems, in which a Simulcast network functionality is currently provided.

2. Related Art

Generally, the term "network" is used to mean the fixed infrastructure of the system. This fixed infrastructure comprises, connected via a backbone, on the one hand the network elements (hereinafter called the network subsystem) which manage the functionalities of the system, and on the other hand the radio transmission and/or reception equipment (hereinafter called the radio subsystem) which handle the air interface with the mobile terminals and which are distributed in such a way as to cover individual geographic areas called cells. When radio transmission means and radio reception means are co-located within one and the same element, this element forms what is called a base station.

The term "Simulcast network" is used to mean all of the elements of the radio subsystem involved in a Simulcast configuration, under the control of the network subsystem. Generally, the Simulcast network comprises the entire radio subsystem, but this is not mandatory.

Among the resources of the network subsystem that are involved in managing the Simulcast network, there is what is called a selection unit or function. The role of this is to choose one or more of the base stations according to a criterion associated with the quality of the radio link on each uplink (link originating at the mobile terminal and terminating at the base station). In practice, a number of base stations can receive the radio signal transmitted by the mobile terminal in conditions enabling them to process it to extract the useful information contained in it, with varying quantities of errors. When the radio signal is organized in frames, these base stations redundantly provide the network subsystem with useful information frames. It is therefore desirable to elect, in other words select (according to quality information associated with each frame) just one stream of frames originating from a predefined base station and disregard the other streams of frames, or, as a variant, to combine several or all of the streams of frames received (using similarity information associated with each frame). The entity performing this operation is the aforementioned selection function. This can be centralized, in other words executed within a predefined element, or distributed over a number of elements.

Figure 1:
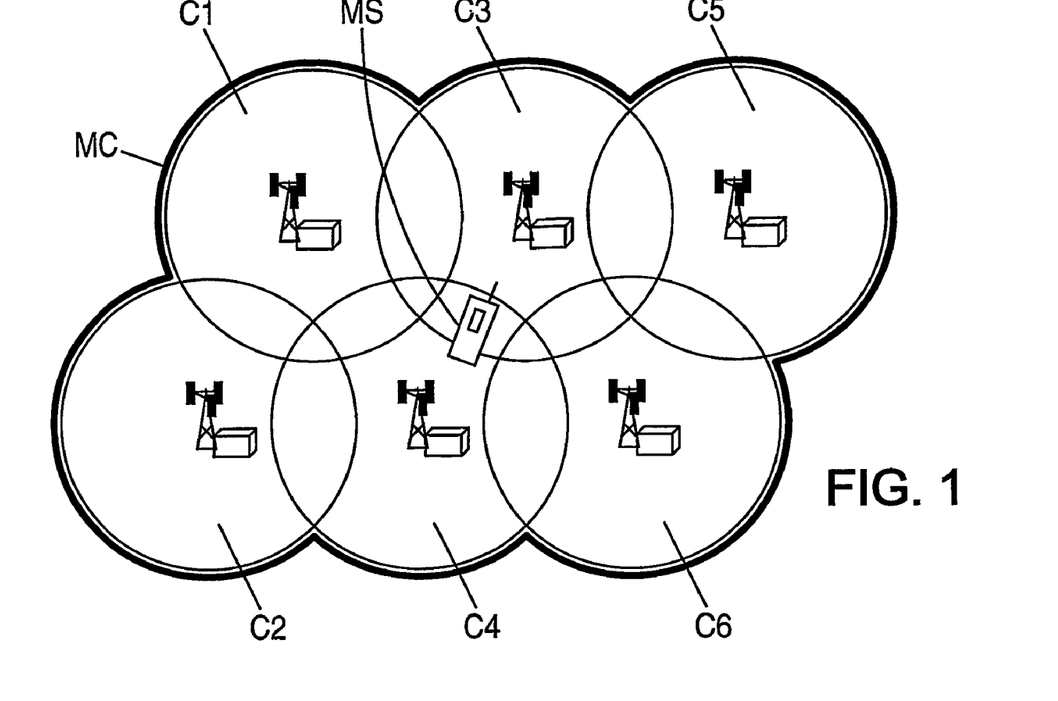
FIG. 1 is a diagram illustrating the principle of a Simulcast network.

As is diagrammatically illustrated in FIG. 1, a Simulcast configuration enables the radio coverage to be extended by creating at least one macrocell MC made up of several individual radio cells C1 to C6, all using the same frequency channel. Thus, a mobile terminal MS located in any of the cells C1 to C6 is able to receive and/or send radio signals from, respectively to, the network. In other words, the mobile terminal MS can handle the current call in the Simulcast network without needing any resource management taking account of its position.

The cells C1 to C6 forming the macrocell MC are normally adjacent. There are therefore overlaps between the different cells that make up the macrocell. The mobile terminal can thus roam from one cell to another without the call being interrupted, and in a manner transparent to it. For the mobile terminal, the macrocell is therefore seen as a single cell.

The present invention is not concerned with the call management policies in a Simulcast network. Consequently, in the interests of simplicity, we will consider here the case of a single mobile terminal involved in a call at a defined moment. The only concerns here will be the techniques of synchronization, both on the downlink channel (in other words from the network to the mobile terminal) and on the uplink channel (in other words from the mobile terminal to the network) of a Simulcast network.

The invention relates in practice to resolving the problem of synchronization on the uplink channel of a Simulcast network.

On each base station, synchronization on the uplink channel can be achieved according to various known principles.

Conventionally, the mobile terminal sends a synchronization sequence, known to the base stations, and having properties enabling such synchronization. For example, the synchronization sequence can be a pseudo-random sequence, with a self-correlation property. Normally, the synchronization sequence is sent by the mobile terminal at the start of the call in the case of a full-duplex mode call, or at the start of each alternate turn in the case of a half-duplex mode call.

Thus, at the start of each call (or at the start of each alternate turn), at least one base station can detect this synchronization sequence and synchronize on the uplink channel, provided that the signal is received with a sufficiently strong power level and with an adequate signal-to-noise ratio. It will be noted that in this case, if the call (or the alternate turn) lasts a long time and the mobile terminal is roaming, the radiofrequency propagation conditions may be altered during the call (or alternate turn) and a new base station may receive a signal originating from the mobile terminal with a sufficiently strong power level to enable it to demodulate the signal correctly.

Similarly, the base station which is synchronized at the start of the call (or alternate turn) may see the power level of the received signal decrease and then become incapable of correctly demodulating that signal. This problem is particularly troublesome for full-duplex mode calls which can last several minutes and for which there is no alternate turn.

A conventional solution to this problem is to have the mobile terminal transmit a synchronization sequence at regular intervals, at times known in principle by the base stations. This method is effective and simple. However, it reduces the available bandwidth on the uplink channel, and therefore, potentially, the audio quality of the speech information to be transmitted.

As a variant, it is also conventional to use, as the synchronization sequence on the uplink channel, a fixed sequence typically placed at the start of each radio burst. Such a sequence is often provided in mobile radio communication systems. It is normally called a training sequence because it can also be used to estimate the radio channel or to initialize its estimation. This sequence is often shorter than the synchronization sequence described in the preceding paragraph. Furthermore, it does not necessarily offer very good self-correlation properties. It is therefore often difficult to use it to synchronize the base stations in a Simulcast network. It may be much too short to enable synchronization with an adequate probability of success.

Furthermore, at the first synchronization level hitherto described, it is often necessary to associate a fine synchronization procedure, in other words, with a precision greater than the duration of a symbol time. Such a procedure can, in certain cases, use the specific characteristics of the signal (called the modulation signature). It should be understood from this that this procedure is not based on signalling information inserted for that purpose in the radio signal. That is possible, for example, with GMSK modulation. The invention seeks to resolve, in a Simulcast network, the problem of synchronization on the uplink channel, without increasing the complexity of the mobile terminal or of the base stations (or at least the network receivers), without reducing the bandwidth of the radio signal, by enabling the base stations (or network receivers) to switch to receive processing mode as quickly as possible after receiving a radio signal originating from the mobile terminal with a sufficiently high power level, and by offering performance as good as the conventional solution by sending synchronization sequences at the start of the call (or at the start of the alternate turn) then sending synchronization sequences at regular intervals.

SUMMARY OF THE INVENTION

To this end, a first aspect of the present invention proposes a method of synchronization on the uplink channel of a Simulcast network which comprises a plurality of fixed receivers and a selection unit, the method comprising the following steps:

a) all the receivers are placed in a synchronization search mode, in which they search for a synchronization pattern in a radio signal sent by a mobile terminal on the uplink channel, by scanning a radio channel associated with the uplink channel;

b) when one or more receivers receive the radio signal and detect said synchronization pattern, they produce a respective initial synchronization context value, which indicates the delay between a time reference of the received radio signal (for example, the header of the first frame) and a time reference of the network (known to all the receivers), and transmit to the selection unit said initial synchronization context value;

c) the selection unit transmits to all the receivers respectively the or a predefined one of the initial synchronization context values received in step b);

d) each receiver having detected the synchronization pattern in step b) starts processing the radio signal on the basis of the initial synchronization context value that it has produced and/or on the basis of the initial synchronization context value that it has received from the selection unit, while the other receivers start processing the radio signal on the basis of the initial synchronization context value that they have received from the selection unit;

e) each receiver, after step d),
transmits to the selection unit useful information frames (speech or signalling) obtained by processing the radio signal, as well as quality information or similarity information associated with each item of useful information in said frames;
maintains its synchronization context using a synchronization tracking algorithm based on the useful information contained in the radio signal, and processes the radio signal on the basis of its maintained synchronization context;
transmits the current value of its duly maintained synchronization context to the selection unit, with at least some of the useful information frames;

f) at regular intervals, the selection unit chooses a defined current synchronization context value from the current synchronization context values respectively transmitted by the receivers, according to a criterion based on the quality information or the similarities respectively associated with the useful information in the corresponding frame, and transmits the duly selected current synchronization context value to all the receivers.

Thus, when the mobile terminal is roaming, and/or when the radiofrequency propagation conditions vary, the call set up on the uplink channel can pass from one receiver to another (in the case of a voting function) or from one group of receivers to another group of receivers (in the case of a combination function), without a receiver that starts to receive the radio signal during a call or an alternate turn needing to synchronize at that moment using a synchronization sequence (or training sequence) which would be provided for this purpose. In other words, the synchronization of the receivers on the uplink channel is maintained from the initial synchronization of the receiver (or of one of the receivers) that initially detects (detect) the synchronization pattern sent by the mobile terminal at the start of the call or alternate turn.

A second aspect of the present invention relates to a Simulcast network in which the receivers and the selection unit are designed to implement a method according to the first aspect.

The invention can be used to implement a functionality of the Simulcast network in an optimal manner without drastically changing the specifications of a system not having been designed with such a functionality, and without making major changes to the equipment (mobile terminals and base stations).

In practice, for the embodiment of the invention described above, the mobile terminals are not modified, the base stations (or at least the receivers of the network) and the selection unit are modified in a very minor way (behaviour on reception of a synchronization context). In other words, only the network subsystem is modified. Furthermore, the invention is advantageously based on the selection unit already provided in a Simulcast network, for choosing from the synchronization contexts returned by the base stations and for relaying them to all the base stations.

The invention is applicable to all types of Simulcast network.

BRIEF DESCRIPTION OF THE DRAWINGS

Other features and advantages of the invention will become apparent on reading the description that follows. This is purely illustrative and should be read in light of the appended drawings, in which.

DESCRIPTION OF PREFERRED EMBODIMENTS

In the description of the invention that follows, the radio transmission channel is considered as a transverse filter, that is modelled by its impulse response.

Figure 2:
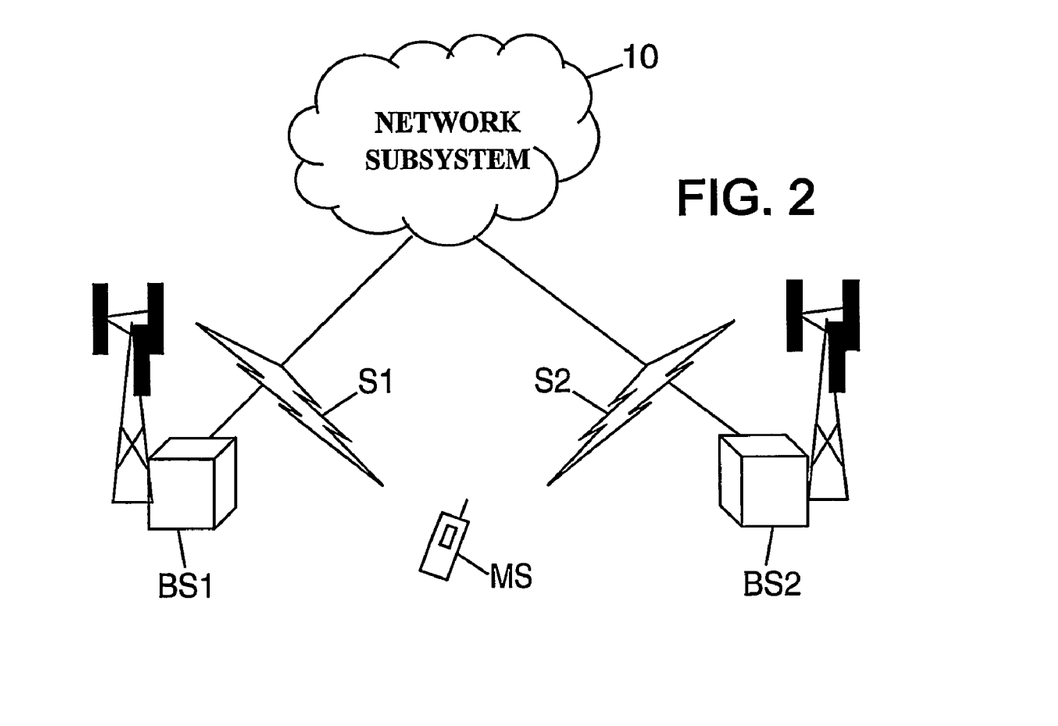
FIG. 2 is a diagram illustrating the principle of operation of the downlink channel in a Simulcast network.

FIG. 2 illustrates the downlink channel (that is, from the network to the mobile terminals) of an exemplary Simulcast network. The network shown here comprises a network subsystem 10, and a radio subsystem with two base stations, respectively BS1 and BS2. Radio signals carrying the same information are broadcast over a channel of the same frequency simultaneously by each of the base stations BS1 and BS2. The signals broadcast in this way normally contain information to be transmitted originating from the network subsystem 10.

The resulting signal received by the mobile terminal is therefore a combination (summation) of the signals received from each base station. In the example shown, S1 and S2 denote the signals received by the mobile terminal from the respective base stations BS1 and BS2. These signals carry the same information.

Because of the radiofrequency propagation, the signals S1 and S2 can have different power levels (for example, because of the distances covered, losses and/or different masking effects for each). Similarly, the signals S1 and S2 can be affected by different delays, due to different distances covered (because, for example, of a different distance between the terminal and each of the base stations), or to reflections from obstacles.

Figure 3:
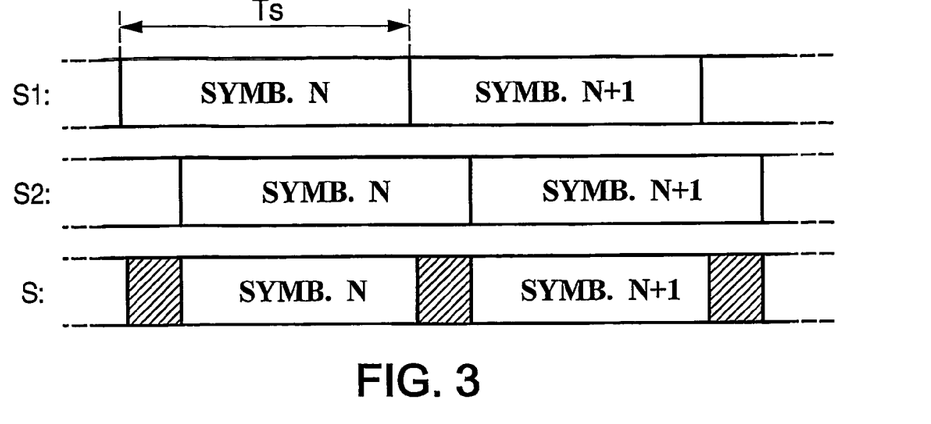
FIG. 3 is a diagram illustrating the inter-symbol interference phenomenon.

The resulting signal S received by the mobile terminal is therefore of the type represented in FIG. 3. This figure shows, by representing the information signals carried, a portion of the signals S1 and S2 corresponding to a few symbols, and the corresponding portion of the resulting signal S received by the mobile terminal. The shaded areas represent the portions of the resulting signal S in which the information relating to different symbols is mixed. These areas represent inter-symbol interference (ISI).

If the ISI is relatively limited, for example if the overlap between symbols is less than a third of the symbol duration Ts, it is possible to demodulate correctly the symbols received without significant performance degradation. Otherwise, a simple demodulation gives degraded performance, and it then becomes necessary to use equalization or other equivalent techniques in the mobile terminal.

Thus, if the terminal is equipped only with a simple demodulation technique (therefore without equalization or an equivalent technique), it cannot demodulate the received signals without significant performance degradation unless the signals are received from different base stations with a relative delay less than a predefined limit δTmax. This limit, or maximum relative delay, depends on the characteristics of the system used, and the characteristics and performance of the demodulator used in the mobile terminal. Furthermore, this limit depends on the relative level of the received signals S1 and S2.

Figure 4:
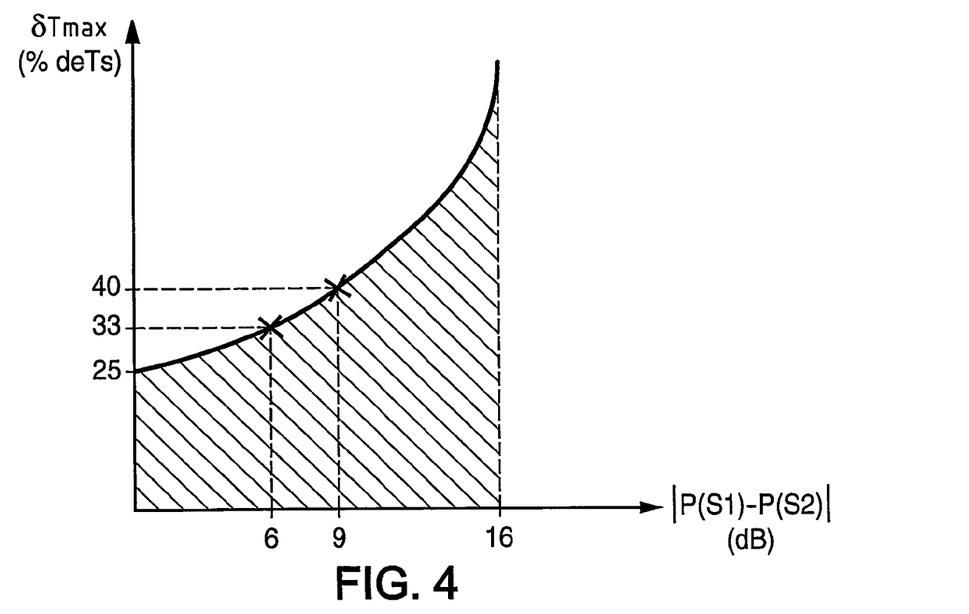
FIG. 4 is a graph showing the maximum acceptable relative delay between the signals received by two base stations (or receivers of the network) according to the power ratio between these two signals.

The curve represented in FIG. 4 gives, in a typical example, the relative limiting delay δTmax (as a percentage of the symbol duration Ts) as a function of the power difference (in dB) between the signals S1 and S2. It will be noted that, to estimate the delay of the received radio signal, a recognizable time reference of the signal, for example the header of the frames that it conveys, is considered in practice. The greater the limit δTmax the greater the difference of power level between the received signal with the highest power level and the other signals. In the example represented in FIG. 4, δTmax is equal to 25% of the duration Ts for two signals S1 and S2 received with the same power level, 33% of the duration Ts for a power level difference of 6 dB between the signals S1 and S2, 40% of the duration Ts for a power level difference of 9 dB between the signals S1 and S2. It will be noted that there is no limit for a power level difference greater than, for example, 16 dB between the signals S1 and S2, because the interference produced in the signal received with the highest power level by the signal received with the lowest power level, is then negligible.

The result of the above considerations is that the radio engineering in the Simulcast network must be such that the curve represented in FIG. 4, in other words in the shaded area, is never exceeded. In other words, for a system in which the terminals use a simple demodulation (in other words, without equalization or an equivalent technique), the deployment of the Simulcast network must satisfy strict requirements regarding the allowable delays between the different signals received by a mobile terminal from the various base stations, to enable communications on the downlink channel.

In a system in which the terminals are equipped with a demodulation function using an equalization or equivalent technique, the demodulator of a mobile terminal is capable, for a given power level ratio between the signals S1 and S2, of demodulating the signal S even for higher values of the relative delay δT between them. However, the equalization algorithms or equivalent techniques also have a maximum limit on the allowable delay between the signals S1 and S2. This limit is also a constraint which must be taken into account in the deployment of a Simulcast network in such systems.

The invention starts from the observation that, in all cases, the dispersion of the respective delays on each path of the downlink channel, in other words for each radio link between a predefined base station and the terminal, corresponding to a significant power level received at the base station, is less than a maximum relative delay δTmax such that:

$$\delta T\max < \frac{1}{2} \times Ts \qquad (1)$$

For the uplink channel (in other words from the mobile terminals to the network), the signals sent by any mobile terminal are received by the base stations, but naturally with different power levels. These power levels depend on the distance, attenuation and any masking effects, between the mobile terminal and each of the base stations, respectively. Nevertheless, a number of base stations are likely to receive the signals sent by the mobile terminal at a sufficient power level to enable the transmitted information to be demodulated. Furthermore, because of the roaming of the mobile terminal, some of the base stations may begin to receive a usable signal from the mobile terminal during the call (or alternate turn) only.

This is why the various base stations are connected to an entity of the network, the function of which is to choose between the information returned by the different base stations, which all originate from the same mobile terminal. This function is called a selection function.

When the selection function is a voting function, its role is to choose (or elect) the information from one signal out of the received signals, on the basis of radio transmission quality information. The signals sent by each of the base stations are normally organized in data blocks, usually called frames. Radio transmission quality information is normally associated with each frame. This quality information can be generated by the base station and transmitted with the frame with which it is associated. The voting function then chooses, from the frames carrying the same information originally from the terminal and returned by the different base stations, the one that offers the best quality. The radio transmission quality information is deduced from the processes performed in the receiver of the base station, and is normally based on the results of the demodulation and/or channel decoding of the signal received by the base station. The quality information is, for example, deduced from the difference between the signal received and demodulated on the one hand, and the signal received, demodulated and decoded, then re-encoded on the other hand.

Alternatively, the selection function can be a combination function. Such a function combines the information respectively received from the different base stations, to improve the quality of this information, being based for example on a similarity associated with each body of information respectively transmitted by the base stations. Such a similarity is, for example, a value encoded on one or two bytes, used to weight the similarity of each information bit transmitted.

Figure 5:
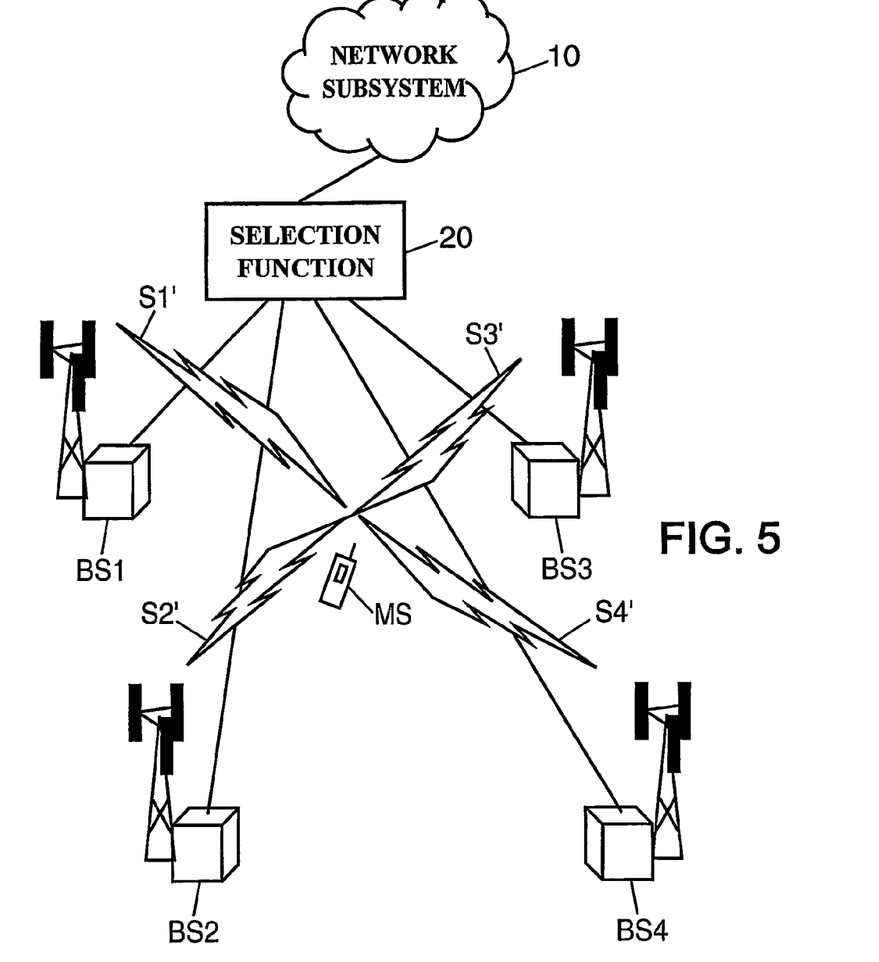
FIG. 5 is a diagram illustrating the principle of operation of the uplink channel in a Simulcast network.

FIG. 5, in which the same elements as in FIG. 2 have the same references, gives a theoretical diagram of the uplink channel of an exemplary Simulcast network having four base stations, respectively BS1 to BS4. The selection function has the reference number 20.

The base stations are synchronized between themselves. Furthermore, the mobile terminal MS is synchronized on the radio signals received from the Simulcast network on the downlink channel. The mobile terminal causes the transmission of a radio signal at a predefined moment relative to the time of synchronization of the mobile terminal on the downlink channel. The result is that the base stations BS1 to BS4 know the theoretical instant at which they should receive a signal, respectively S1' to S4', from the mobile terminal MS.

This knowledge is, however, imperfect, because of the different distances between the terminal and each of the base stations which cause a propagation delay on the radio channel. Furthermore, if the direct path with a base station is masked, the signal from the mobile terminal may be received by the base station after reflection on obstacles.

Normally, a system is dimensioned to enable calls up to a maximum distance Dmax within an individual cell corresponding to the coverage of a single base station. Thus, depending on the position of the mobile terminal in the network, each base station can receive the signal from the mobile terminal with a predefined delay relative to a time reference To of the network corresponding to the earliest instant of reception by the base station of the signal sent by the mobile terminal (case where the mobile terminal is at the foot of the base station), said predefined delay corresponding to a distance located between 0 and 2×Dmax. This delay, ΔTmax, is an absolute delay, in the sense that it is expressed relative to a time reference (fixed) of the network. It will be noted that this delay in fact corresponds to the round-trip path, in other words, the path in the downlink direction and then in the uplink direction, hence the factor 2 which is introduced. Furthermore, other delays may be generated by characteristic dispersions of components of the radio transmission and reception subsystems. Conveniently, a maximum delay ΔTmax can thus be expressed as an integer number p of symbol times. In other words, the maximum delay ΔTmax is given by the following relation:

$$\Delta Tmax = p \times Ts \qquad (2)$$

in which p is a strictly positive number (normally, p is an integer number), and in which Ts denotes the duration of a symbol (symbol time).

An example can be given with a system allowing calls up to a distance Dmax of 75 km per cell, and operating with a symbol rate of 8 kbauds (or 8000 symbols per second). The symbol duration Ts is then equal to 125 μs. The maximum delay corresponds to a round trip of 150 km, or 500 μs, in other words to 4 symbol times Ts. In practice, a maximum delay ΔTmax of 5 symbol times will be assumed to take account of the delays generated by the dispersions of the components in the radio transmission and reception subsystems. In other words p is equal to 5 in this example.

Thus, each base station must begin by acquiring synchronization on the time band [0, ΔTmax] described above. This band may correspond, depending on the system, to a number of symbol times. Only after having acquired this time synchronization will the base station be able to switch to an operating mode in which it can demodulate the received signal and perform the other receive processing functions, such as channel decoding, for example. In the description below, this mode of operation is called receive processing mode. At the end of the duly completed processes, the base station can transmit to the selection function 20 the useful information extracted, corresponding to speech or data.

Naturally, the configurations represented in FIGS. 2 and 5 can be extended to a large number of base stations. They are also applicable to configurations in which the radio transmitters and the radio receivers of the radio subsystem are not co-located. This is why everything stated here about the base stations concerning the downlink channel applies to the transmitters of the network in such a configuration, whereas, symmetrically, everything that is stated about the base stations concerning the uplink channel applies to the receivers of the network in such a configuration.

As has been explained above, synchronization on the downlink channel in a Simulcast network requires the deployment of the network to respect the requirements associated with the maximum delay δTmax (relative delay) seen by the terminal between the signals received from different base stations (or transmitters of the network).

Assuming that the radiofrequency propagation conditions are substantially symmetrical, in other words that they are substantially the same on the uplink channel and on the downlink channel, the dispersion of the delays observed on the uplink channel is also less than the maximum relative delay δTmax. Naturally, in reality, the radiofrequency propagation conditions are not necessarily exactly symmetrical. This stems in particular from the use, in general, of different frequencies on the downlink channel and on the uplink channel. However, they remain virtually symmetrical in particular with respect to the propagation delay.

A particular case is that in which the radio transmitters and receivers are not co-located, unlike the case with base stations. In this particular case, it is assumed that, to maintain the same maximum dispersion on the uplink channel as on the downlink channel, the network is engineered to ensure compliance with the same rules of maximum delay between the different terminal-receiver paths for the uplink channel as between the receiver-terminal paths for the downlink channel. It will be noted that this assumption is naturally borne out in the case with base stations.

Consequently, it can be assumed that, in a Simulcast network, the deployment rules dictate, for the uplink channel as for the downlink channel, a maximum value of the dispersion of the delays between the different paths, which satisfies the relation (1) given above.

In practice, this dispersion is normally less than 40% of the symbol time duration Ts, except for paths at least 9 dB weaker than the path giving the highest power level, but these latter paths can, however, be disregarded.

Figure 6:
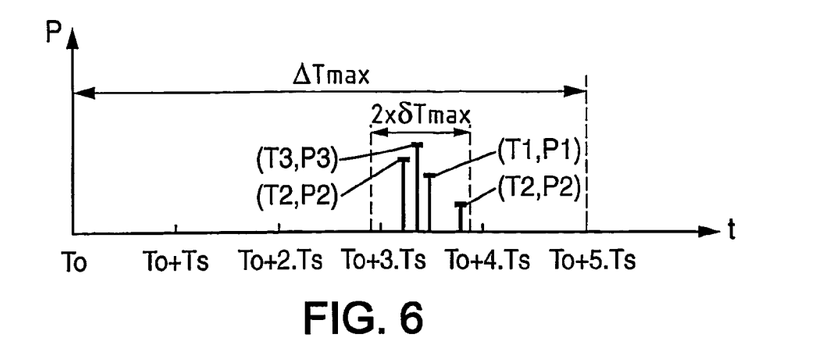
FIG. 6 is a diagram illustrating the maximum delay between a time reference of the radio signal received by a base station (or a receiver of the network) and a time reference of the network, compared with the maximum acceptable relative delay between the signals received by two base stations (or receivers of the network) with sufficient strength to enable acceptable quality processing for the service (speech, data transmission, etc) offered.

The diagram in FIG. 6 illustrates an example of impulse response of the transmission channel, as seen from the network, to a signal sent by the mobile terminal MS at a predefined instant (not represented) according to a time reference To of the network.

In this figure, T1 to T4 denote the instants at which the respective signals S1' to S4' are received by the respective base stations BS1 to BS4. Furthermore, P1 to P4 denote the respective power levels of these signals. In the example shown, the following relation strings apply:

$$T2 < T3 < T1 < T4 \quad (3)$$

and $$P4 < P1 < P2 < P3 \quad (4)$$

In other words, it is the signal S2' that is received first, and it is the signal S3' that is received with the highest power level. It will be noted, in practice, that it is not necessarily the signal received first that is received with the highest power level, because, for example, of the presence of greater masking effects on the path of the signal received first.

As can be seen, the signals S1' to S4' are received in the time interval [To; To+ΔTmax]. Furthermore, these signals are received in a time interval with a temporal width equal to (2×δTmax).

Thus, if a predefined base station has succeeded in being synchronized, it is virtually certain that the other base stations will be synchronized within a time interval of between half a symbol time leading and half a symbol time lagging relative to the synchronization obtained by said base station.

This is why the method provides for transmission of synchronization information from a base station of the Simulcast network which is synchronized, to all the other base stations of the Simulcast network. The term synchronization information is used to mean information indicating the actual delay between the time reference of the network and the reception by said base station which is synchronized of the signal from the mobile terminal. Thus, the other base stations of the Simulcast network receive synchronization information which corresponds to their synchronization to within plus or minus half a symbol time. This defines a time band for carrying out the search for their synchronization, bounded by the maximum relative delay δTmax leading or lagging relative to the synchronization information received. This time band is much narrower than a time band based on the maximum delay ΔTmax between a time reference To of the network and a time reference of the signal sent by the mobile terminal.

In particular embodiments of the invention, the method allows for the transmission of synchronization information (or synchronization context) at least from the base station of the Simulcast network that is synchronized first. This synchronization context can, for example, be associated with synchronization quality information, which can be quality information or similarity information associated with a frame of the signal received by the base station. For example, the synchronization context is transmitted by the base station concerned to the selection function (voting or combination function) or any other function or element of the network subsystem. This function or this element, receiving the synchronization context, rebroadcasts it to the other base stations via the backbone of the network. The selection function is a particularly advantageous entity. In practice, in cases where a number of base stations are synchronized, the selection function, for example based on quality information (in the case of a voting function), or for example based on similarities from which can be deduced quality information (in the case of a combination function), can decide from which base station it will transmit the synchronization context to the other base stations. In other words, in the case of a voting function, this selection is made in the same way as the selection of the stream of frames naturally made by the selection function. In the case of a combination function, the quality information is easily deduced from the similarities in the information of each frame.

It follows that synchronization is much easier to obtain with this arrangement. In particular, it is possible to dispense with the synchronization sequence sent at regular intervals, or at least it is possible to limit the method to a relatively short synchronization sequence (training sequence) at the start of each radio burst. Bandwidth is therefore freed up for transmitting useful information.

A possible embodiment of the invention will now be described in light of the diagram in FIG. 7.

In a first step 701, the selection function broadcasts in the macrocell a signal carrying a SYNC_SEARCH command. This signal is received by each of the base stations BS1 to BS4. The command results in all of the base stations being set to a state 702 which corresponds to a synchronization search mode. In this operating mode, they scan the radio channel associated with the uplink channel of the Simulcast network, to detect a synchronization pattern sent by the mobile terminal for example at the start of a call or at the start of an alternate turn.

When, in step 703, the mobile terminal starts to send over the uplink channel of the Simulcast network a radio signal S containing the synchronization pattern, each of the base stations BS1 to BS4 receives a respective version S1(0) to S4(0) of the signal S. Each of the signals S1(0) to S4(0) is distinguished from the signal S by a respective attenuation and delay dependent on the radiofrequency propagation conditions between the mobile terminal and the respective base stations BS1 to BS4.

The radio engineering of the Simulcast network is such that at least one base station is synchronized on the uplink channel, in other words, it receives the radio signal with a power level sufficient to demodulate it and decode it, when the terminal is within the coverage of the Simulcast macrocell. It therefore detects the synchronization pattern. In the example represented in FIG. 7, the base stations BS2 and BS3 are in this situation.

They then produce an initial value, respectively SC2(0) and SC3(0), of a synchronization context which is a binary word having a predefined number q of bits. In one example, q is equal to eight (q=8). The synchronization context is therefore a data byte.

Furthermore, the base stations BS2 and BS3 switch to a state 704, in which they start processing the radio signal that they receive. This processing is started on the basis of the initial value of their synchronization context, i.e. SC2(0) and SC3(0) respectively.

Figure 8:
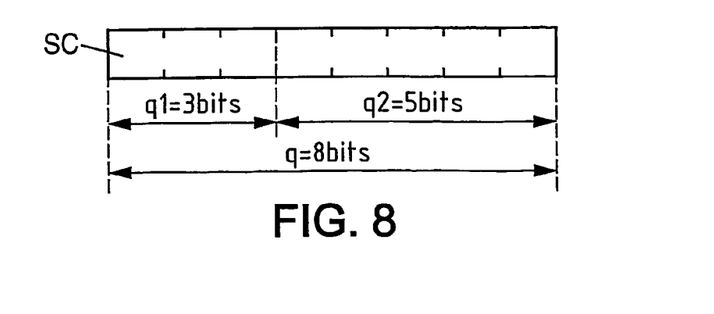

An example of synchronization context SC is shown in FIG. 8. In this example, the context is a byte of which a predefined number q1 of first bits encode the integer number of symbol times Ts separating a time reference of the radio signal received by the base station on the one hand, and a time reference of the network (known to all the base stations) on the other hand. The synchronization context SC also comprises a predefined number q2 of second bits which encode the integer number of fractions of a symbol time Ts, each corresponding to a $\frac{1}{2^q}$th of a symbol time Ts, which also separate the two aforementioned time references.

For example, q is preferably equal to the sum of q1 and q2 (q=q1+q2). In this case, when q is equal to 8, q1 can, for example, be equal to 3, and q2 can be equal to 5. This means that a delay of the radio signal of up to 8 symbol times Ts can be encoded with a precision corresponding to $\frac{1}{32}$th of Ts.

Finally, in step 705, the base stations BS2 and BS3 which are synchronized transmit to the selection function 20 the initial value of their respective synchronization context, i.e. SC2(0) and SC3(0). This value is preferably associated with synchronization quality information, respectively QUAL2(0) and QUAL3(0). This information can be calculated from the result of the correlation of the received signal with the synchronization sequence. The selection unit 20 receives, in step 706, the values SC2(0) and SC3(0), as well as the information QUAL2(0) and QUAL3(0) if appropriate. If, as in the example considered here, it receives several synchronization context values, it selects the one that is associated with the best synchronization quality information.

In step 707, the selection unit 20 retransmits, to all the base stations BS1 to BS4 of the network (i.e. in a broadcast signal), the single synchronization context that it has received, or, if appropriate, the one that it has selected in step 706. In the example represented, it is assumed that it has selected and that it therefore retransmits the initial synchronization context value SC3(0) of the base station BS3.

The base stations BS2 and BS3 which have detected the synchronization pattern, have, for example, switched to the radio signal processing mode 704. The other base stations, in other words the base stations BS1 and BS4 in the example represented, switch to the processing mode 704 on receiving the value SC3(0) transmitted by the selection unit 20 in step 707. For them, processing of the radio signal is started on the basis of the value SC3(0) that they have received.

It will be noted that it is possible for the base stations BS2 and BS3 to switch to the operating mode 704 also on receiving the signal broadcast by the selection unit 20 in step 707. In this case, the processing of the radio signal is started in the base station BS2 on the basis of the initial value SC2(0) of its synchronization context, or on the basis of the initial synchronization context value SC3(0) transmitted by the selection unit 20, or even on a combination of these two values. In the base station BS3, for which the initial synchronization context value SC3(0) has been selected by the selection unit 20, the processing is systematically started on the basis of this value.

When the base stations have switched to the radio signal processing mode, they return all the information extracted from the radio signal, frame by frame. For each frame, this information is accompanied, for example, with quality information if the selection function is a voting function. This information is, for example, deduced from the difference between the signal received and demodulated, on the one hand, and the signal received, demodulated and decoded, then re-encoded, on the other hand. In a variant in which the selection function implements a combination function, similarity information is associated with each frame, at a rate, for example, of one item of similarity information (encoded, for example, on one or two bytes) for each useful information bit.

Having switched to the received signal demodulation and processing mode, each base station maintains (i.e., recalculates and updates) its synchronization context, using a temporal synchronization tracking algorithm linked, for example, to the processing of the received signal, and in particular to the demodulation. Such processing is based on the useful information contained in the radio signal, and, where appropriate, on the training sequence. The base station returns to the selection function the current value of its synchronization context, for example with each frame in addition to the information extracted for the corresponding frame and the aforementioned quality information.

Figure 7:
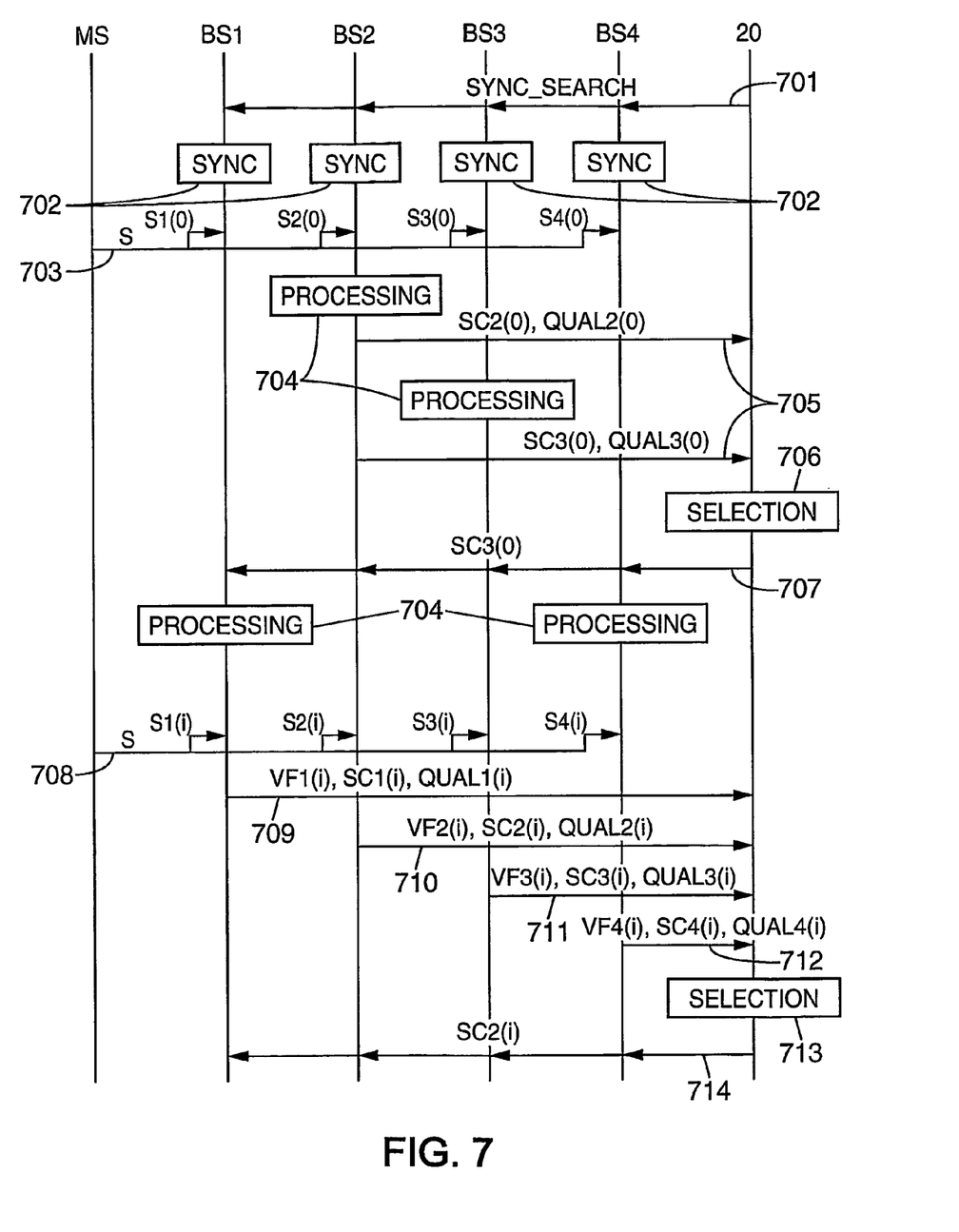
FIG. 7 is a step diagram illustrating the method according to the invention; and, FIG. 8 is a diagram illustrating an example of synchronization context according to the invention.

Thus, in the example represented in FIG. 7, for a respective version $S1(i)$ to $S4(i)$ of a portion of the signal S sent in step 708 by the mobile terminal MS and corresponding to a predefined frame, which version is received by the respective base stations BS1 to BS4:

in step 709, the base station BS1 transmits to the selection unit 20 a useful information frame $VF1(i)$, the current value $SC1(i)$ of its synchronization context, and the quality information $QUAL1(i)$ or the similarity information associated with each item of useful information in said frame;

in step 710, the base station BS2 transmits to the selection unit 20 a useful information frame $VF2(i)$, the current value $SC2(i)$ of its synchronization context, and the quality information $QUAL2(i)$ or the similarity information associated with each item of useful information of said frame;

in step 711, the base station BS3 transmits to the selection unit 20 a useful information frame $VF3(i)$, the current value $SC3(i)$ of its synchronization context, and the quality information $QUAL3(i)$ or the similarity information associated with each item of useful information of said frame; and finally, in step 712, the base station BS4 transmits to the selection unit 20 a useful information frame $VF4(i)$, the current value $SC4(i)$ of its synchronization context, and the quality information $QUAL4(i)$ or the similarity information associated with each item of useful information of said frame.

In step 713, the selection function 20 receives in particular the current synchronization context values $SC1(i)$ to $SC4(i)$ originating from the respective base stations BS1 to BS4. Furthermore, it selects one of them using the quality information $QUAL1(i)$ to $QUAL4(i)$ as the basis, or it calculates quality information from similarity information associated with the frame concerned.

In step 714, the selection function then transmits the current synchronization context value selected to all the base stations (i.e. via a broadcast signal).

The decision as to the choice of synchronization context can even be made only every N frames or even at a frequency approximately equal to every N frames, in which N is an integer number greater than or equal to unity. For a better base station synchronization quality, it can be made, for example, on each frame, in other words N is then equal to unity (N=1). As a variant, the decision is made by filtering over a number of frames.

It will be noted that the base stations process the radio signal in the radio channel associated with the uplink channel (in particular they demodulate it) using a synchronization corresponding to the current value of their own synchronization context. When they receive a new current synchronization context value, they can, for example:

continue to use the current value of their own synchronization context, or use a synchronization corresponding to said new current synchronization context value, or even progressively take account of said new current synchronization context value by updating, for example by filtering, their own current synchronization context value.

If any base station demodulates and decodes, for example, a signal received with a power level which is too low and therefore not usable, the useful information extracted from this signal is normally not relevant from a quality point of view. The base station then transmits to the selection function, for the frames concerned, quality information, or very weak similarity information. The corresponding information frames are then rejected by the selection function. The base station can also decide simply to transmit to the selection function information indicating that the useful information is not relevant, in addition to or in place of the information normally transmitted with each extracted information frame.

If, at a given time, the selection function no longer receives valid or usable current synchronization context values from any base station, it transmits to all the base stations, in step 714, a broadcast signal containing information according to which the synchronization on the uplink channel is lost. This information may be a command, which makes the base stations switch to the operating mode 702 (synchronization search mode).

In a particular embodiment, when a base station switches to the processing mode 704, it begins by performing a fine synchronization search limited to a band of plus or minus half a symbol time before beginning to demodulate the radio signal. This preliminary fine synchronization search is used to start the demodulation with a smaller synchronization error, and therefore with a lower probability of demodulating (and therefore decoding) incorrectly. Such fine synchronization can, for example, use the particular features of certain modulation systems, which offer an adequate signature (for example, GMSK modulation).

Furthermore, when it detects, while processing the radio signal, that the information resulting from its receive mode processes is not relevant from a qualitative point of view, a base station can also decide, after a certain number of non-relevant frames or, for example, when a certain rate of non-relevant frames is reached, to switch back to the fine synchronization search mode.

A variant is applicable in the case of a system implementing terminals using an equalization algorithm or an equivalent processing. In this case, the dispersion of the delays is also reduced and depends on the capacity of the terminal to equalize, or perform the equivalent processes, over a predefined number M of successive symbols. It is then possible to implement, in the base stations, a demodulation with equalization (or equivalent processing) or other processing for taking into account the dispersion of the delays as seen from the base stations. It is, for example, possible to implement in the base stations a process for equalizing, or performing an equivalent processing, over a number 2×M of successive symbols. The embodiment of the invention is then similar to the example described above in relation to the diagram in FIG. 7.

Another variant can be used to perform, as in the variant in the paragraph above, a fine synchronization using, for example, the particular characteristics (signature) of the modulation, as, for example, in the case of GMSK modulation. In this case, it is enough to implement a simple demodulation in the base stations, or, where appropriate, an equalization or equivalent processing, but over a smaller number of symbols than that described in the variant of the paragraph above. The implementation of this other variant is then equivalent to that described above.

The invention claimed is:

1. Method of synchronization on the uplink channel of a Simulcast network which comprises a plurality of fixed receivers and a selection unit, the method comprising the steps according to which:

a) all the receivers are placed in a synchronization search mode, in which they search fox a synchronization pattern in a radio signal sent by a mobile terminal on the uplink channel, by scanning a radio channel associated with the uplink channel;

b) when one or more receivers receive the radio signal and detect said synchronization pattern, they produce a respective initial synchronization context value, which indicates the delay between a time reference of the received radio signal and a time reference of the network, and transmit to the selection unit said initial synchronization context value;

c) the selection unit transmits to all the receivers respectively the or a predefined one of the initial synchronization context values received in step b);

d) each receiver having detected the synchronization pattern in step b) starts processing the radio signal on the basis of the initial synchronization context value that it has produced and/or on the basis of the initial synchronization context value that it has received from the selection unit, while the other receivers start processing the radio signal on the basis of the initial synchronization context value that they have received born the selection unit;

e) each receiver, after step d), transmits to the selection unit useful information frames obtained by processing the radio signal, as well as quality information or similarity information associated with each item of useful information in said frames;

maintains it synchronization context using a synchronization tracking algorithm based on the useful information contained in the radio signal, and processes the radio signal on the basis of its maintained synchronization context;

transmits the current value of its duly maintained synchronization context to the selection unit, with at least some of the useful information frames;

f) at regular intervals, the selection unit chooses a defined current synchronization context value horn a current synchronization context values respectively transmitted by the receivers, according to a criterion based on the quality information or the similarities respectively associated with the useful information of the corresponding frame, and transmits the duly selected current synchronization context value to all the receivers.

2. Method according to claim 1, wherein each receiver, having detected the synchronization pattern in step b), automatically starts processing the radio signal on the basis of its respective initial synchronization context, as soon as said synchronization pattern is detected, and produces synchronization quality information, which is transmitted to the selection unit in association with said initial synchronization context.

3. Method according to claim 2, wherein, in step c), the initial synchronization context sent by the selection unit in step c), is chosen by the selection unit, where appropriate from a plurality of initial synchronization contexts respectively sent by receivers in step b), according to a criterion based on the synchronization quality information respectively associated with said initial synchronization contexts.

4. Method according to claim 1, wherein, in step d), said other receivers start processing the radio signal on reception of the initial synchronization context transmitted by the selection unit.

5. Method according to claim 1, wherein a new current synchronization context value is chosen by the selection unit on reception of a current synchronization context value every N current synchronization context values successively transmitted by the receivers, in which N is an integer number greater than or equal to unity.

6. Method according to claim 5, wherein N is equal to unity.

7. Method according to claim 1, wherein, in step f), the selection unit transmits to the receivers a command which makes them switch to the synchronization search mode for want of being able to choose and transmit a current synchronization context value.

8. Method according to claim 1, wherein the synchronization quality information is calculated from our the result of the correlation of the received signal with the synchronization sequence.

9. Method according to claim 1, wherein the quality information associated with a flame is deduced from the difference between the signal received and demodulated on the one hand and the signal received, demodulated and decoded, then re-encoded, on the other hand.

10. Method according to claim 1, wherein each receiver transmits to the selection unit, in addition to or in place of the quality information or similarity information associated with a flame, information indicating, where appropriate, that the useful information transmitted is not relevant flour the qualitative point of view.

11. Method according to claim 1, wherein, on receiving a current synchronization context value transmitted by the selection unit, each receiver continues processing the radio signal on the basis, either of the current value of its synchronization context, or of said current synchronization context value transmitted by the selection unit, or of the current value of its synchronization context filtered with said current synchronization context value transmitted by the selection unit.

12. Method according to claim 1, wherein the selection unit implements a voting function.

13. Method according to any one of claim 1, wherein the selection unit implements a combination function.

14. Method according to claim 1, wherein, before starting the processing in step d), at least some of the receivers perform a fine synchronization search limited to a time band corresponding to plus or minus half a symbol time.

15. Method according to claim 1, wherein, when it detects that the useful information obtained by processing the radio signal is no longer relevant from the qualitative point of view, a receiver performs a fine synchronization search limited to a time band corresponding to plus or minus half a symbol time.

16. Method according to claim 1, wherein the processing of the radio signal received from the mobile terminal implements an equalization algorithm or similar.

17. Method according to claim 1, wherein a synchronization context is a binary word comprising a predefined number q of bits, of which a predefined number q1 of bits encode the integer number of symbol times separating a time reference of the radio signal and a time reference of the network and a predefined number q2 of bits encode a number of fractions of a symbol time separating said time reference of the radio signal and said time reference of the network, in which q, q1 and q2 are integer numbers.

18. Method according to claim 17, wherein q=8, q1=3 and q2=5.

19. A simulcast network including a plurality of fixed receivers and a selection unit, wherein the receivers and the selection unit are designed to implement a method according to claim 1.

20. A simulcast network according to claim 19, also comprising fixed transmitters, which are not co-located with the receivers.

* * * * *

UNITED STATES PATENT AND TRADEMARK OFFICE
CERTIFICATE OF CORRECTION

PATENT NO. : 7,454,219 B2
APPLICATION NO. : 10/596800
DATED : November 18, 2008
INVENTOR(S) : Philippe Mege et al.

Page 1 of 1

It is certified that error appears in the above-identified patent and that said Letters Patent is hereby corrected as shown below:

On column 14, Line 19: please replace "fox" with -- for --

On column 14, Line 40: please replace "born" with -- from --

On column 14, Line 57: please replace "horn" with -- from --

On column 15, Line 31: please delete "our"

On column 15, Line 34: please replace "flame" with -- frame --

On column 15, Line 42: please replace "flour" with -- from --

Signed and Sealed this

Seventeenth Day of November, 2009

David J. Kappos
*Director of the United States Patent and Trademark Office*